United States Patent
Liu et al.

(10) Patent No.: US 10,999,873 B2
(45) Date of Patent: May 4, 2021

(54) METHOD AND DEVICE FOR TWO-STEP RANDOM ACCESSING

(71) Applicant: Telefonaktiebolaget LM Ericsson (publ), Stockholm (SE)

(72) Inventors: Jinhua Liu, Beijing (CN); Henrik Sahlin, Mölnlycke (SE); Naga Vishnu Kanth Irukulapati, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/477,457

(22) PCT Filed: Sep. 21, 2017

(86) PCT No.: PCT/CN2017/102652
§ 371 (c)(1),
(2) Date: Jul. 11, 2019

(87) PCT Pub. No.: WO2018/133437
PCT Pub. Date: Jul. 26, 2018

(65) Prior Publication Data
US 2019/0387551 A1 Dec. 19, 2019

(30) Foreign Application Priority Data
Jan. 23, 2017 (WO) ................ PCT/CN2017/072254

(51) Int. Cl.
*H04W 4/00* (2018.01)
*H04W 74/08* (2009.01)
(Continued)

(52) U.S. Cl.
CPC ....... *H04W 74/0833* (2013.01); *H04L 5/0016* (2013.01); *H04L 5/0051* (2013.01); *H04L 27/2607* (2013.01); *H04W 72/0466* (2013.01)

(58) Field of Classification Search
CPC . H04L 27/2607; H04L 5/0016; H04L 5/0044; H04L 5/0051; H04L 5/0053; H04W 72/0466; H04W 74/0833
See application file for complete search history.

(56) References Cited

U.S. PATENT DOCUMENTS

2015/0023270 A1* 1/2015 Park ..................... H04L 5/0048
370/329
2015/0289292 A1 10/2015 Sun et al.
(Continued)

FOREIGN PATENT DOCUMENTS

| CN | 106304383 A | 1/2017 |
| WO | 2014/110714 A1 | 7/2014 |

OTHER PUBLICATIONS

International Search Report and Written Opinion issued in International Application No. PCT/CN2017/102652, dated Dec. 6, 2017, (11 pages).
(Continued)

*Primary Examiner* — Minh Trang T Nguyen
(74) *Attorney, Agent, or Firm* — Rothwell, Figg, Ernst & Manbeck, P.C.

(57) ABSTRACT

A method and device for two-step random accessing. The method includes transmitting a random access preamble and a data block on a time-frequency resource to a network device; and receiving a response message for the random accessing from the network device. The data block is encoded with an orthogonal cover code and/or a cyclic shift, and the data block comprises data information and a reference signal associated with the data information. Therefore, resource efficiency is improved significantly for an associated data message following a random access preamble with endurable minor performance degradation.

20 Claims, 12 Drawing Sheets

(51) Int. Cl.
  *H04L 5/00* (2006.01)
  *H04L 27/26* (2006.01)
  *H04W 72/04* (2009.01)

(56) References Cited

U.S. PATENT DOCUMENTS

| | | | |
|---|---|---|---|
| 2015/0319779 | A1 | 11/2015 | Li et al. |
| 2017/0013610 | A1* | 1/2017 | Lee ................. H04L 1/1861 |
| 2017/0251499 | A1* | 8/2017 | Radulescu ........... H04J 11/0036 |
| 2019/0223157 | A1* | 7/2019 | Hwang ............... H04L 27/2602 |
| 2019/0274168 | A1* | 9/2019 | Hwang ............... H04L 27/2602 |

OTHER PUBLICATIONS

Catt, "Further considerations on a 2-step RA Procedure", 3GPP TSG RAN WG1 AH_NR Meeting, R1-1700186, Spokane, USA Jan. 16-20, 2017 (4 pages).

Supplementary European Search Report issued in European Application No. 1789 2779, dated Nov. 4, 2019 (13 pages).

MediaTek Inc., "Considerations on 2-step RACH physical channel design", 3GPP TSG RAN WG1 Meeting #87, R1-1612142, Reno, USA Nov. 14-18, 2016 (3 pages).

Nokia, et al., "On 2-step Random Access Procedure", 3GPP TSG-RAN WG1 AH_NR Meeting, R1-1700652, Spokane, USA Jan. 16-20, 2017 (5 pages).

Motorola Mobility, "Physical channel design for 2-step RACH", 3GPP TSG RAN WG1 Meeting NR, R1-1700880, Spokane, USA Jan. 16-20, 2017 (5 pages).

ZTE, et al., "2-step Random Access Procedure", 3GPP TSG RAN WG1 AH_NR Meeting, R1-1700105, Spokane, USA Jan. 16-20, 2017 (10 pages).

Ericsson, "Aspects for contention based UL transmission in NR", 3GPP TSG-RAN WG2 NR Ad Hoc, Tdoc R2-1700431, Spokane, USA Jan. 17-19, 2017 (4 pages).

* cited by examiner

METHOD AND DEVICE FOR TWO-STEP RANDOM ACCESSING

CROSS REFERENCE TO RELATED APPLICATION(S)

This application is a 35 U.S.C. § 371 National Stage of International Patent Application No. PCT/CN2017/102652, filed Sep. 21, 2017, designating the United States and claiming priority to Chinese Application No. PCT/CN2017/072254, filed Jan. 23, 2017. The above identified applications are incorporated by reference.

TECHNICAL FIELD

Embodiments of the present disclosure generally relate to the field of communications, and more particularly, to a method and device for two-step random accessing.

BACKGROUND

This section introduces aspects that may facilitate better understanding of the present disclosure. Accordingly, the statements of this section are to be read in this light and are not to be understood as admissions about what is in the prior art or what is not in the prior art.

Random access (RA) procedure is discussed for new radio (NR) in $3^{rd}$ generation partnership project (3GPP). There are two types of RA procedures, one is four-step (4-step) RA procedure and the other is two-step (2-step) RA procedure. As per RAN1 agreement, similar 4-step random access procedure as in long term evolution (LTE) is to be at least supported by NR.

FIG. 1 is a diagram which shows four-step RA procedure. As shown in FIG. 1, a user equipment (UE) may transmit a random access preamble to a network device (such as New Radio base station, also referred to as gNB) in step 1 on a physical random access channel (PRACH). Then, the gNB may transmit a random access response (RAR) to the UE in step 2, for example, an uplink-grant for a transmission in step 3 may be included in the RAR. The UE may perform a scheduled transmission to transmit data, such as UE-ID and status buffer, in step 3. Then the gNB may response with a contention resolution at step 4, for example, the UE-ID may be included in a response message for indicating a random access to the UE.

Besides, a two-step approach is also under study in RAN1. For the two-step approach, network (NW) may configure (e.g., via system information signaling) random access preambles, resources for PRACH transmission and associated contention based data resources. For example, in LTE (Long Term Evolution), there are up to 64 preambles be configured in a cell's region for contention based access and it is allowed to multiplex multiple PRACH transmission over one time-frequency resource for PRACH.

FIG. 2 is a diagram which shows two-step RA procedure. As shown in FIG. 2, in step 1, the UE may transmit a PRACH preamble (also referred to as a random access preamble) and data that at least identify the UE itself by means of a UE ID on resource that associated to the preamble. In step 2, a contention resolution message is transmitted by the gNB. Hence, the two-step approach may pare down the round trip required for the gNB to transmit RAR and UE to transmit the data and consequently reduce latency of the RA procedure.

FIG. 3 is a diagram which shows an example of step 1 in two-step RA procedure. As shown in FIG. 3, the data is transmitted following the PRACH preamble for the two-step RA procedure without waiting for the RAR from the network device (such as gNB).

SUMMARY

It has been found that in the two-step RA procedure, for N PRACH preambles, N time-frequency resources are pre-configured correspondingly. That is to say, the associated data transmission stick with the PRACH transmission requires pre-allocated data resources.

If different data resource is allocated for each PRACH preamble and there are multiple PRACH preambles configured for two-step RA procedure, it requires to reserve multiple data resources. Because there may be at most a few terminal devices that initiate the two-step RA in one PRACH slot, the reserved data resources may be of low utilization, which means waste of resources.

For instance, if there are 64 PRACH preambles and 64 blocks of data resources need to be reserved, it is a large resource waste if there are only 1 or 2 users initiating the two-step RA procedure in one PRACH slot.

In order to solve at least part of the above problems, methods, apparatus, devices and computer programs are provided in the present disclosure. It can be appreciated that embodiments of the present disclosure are not limited to a wireless system operating in NR network, but could be more widely applied to any application scenario where similar problems exist.

Various embodiments of the present disclosure mainly aim at providing methods, devices and computer programs for controlling a transmission between a transmitter and a receiver, for example, in a shared frequency band. Either of the transmitter and the receiver could be, for example, a terminal device or a network device. Other features and advantages of embodiments of the present disclosure will also be understood from the following description of specific embodiments when reading in conjunction with the accompanying drawings, which illustrate, by way of example, the principles of embodiments of the present disclosure.

In general, embodiments of the present disclosure provide a solution for random accessing. A random access preamble and a data block on a time-frequency resource are transmitted. The data block is encoded with an orthogonal cover code (OCC) and/or a cyclic shift (CS), and the data block includes data information and a reference signal associated with the data information.

In a first aspect, there is provided a method for two-step random accessing. The method includes transmitting a random access preamble and a data block on a time-frequency resource to a network device; and receiving a response message for the random accessing from the network device. The data block is encoded with an orthogonal cover code and/or a cyclic shift, and the data block comprises data information and a reference signal associated with the data information.

In one embodiment, the random access preamble belongs to a plurality of random access preambles which are associated with the time-frequency resource for data.

In one embodiment, the method further includes selecting the random access preamble from the plurality of random access preambles; determining the orthogonal cover code and the time-frequency resource according to the random access preamble; and encoding the data information using the determined orthogonal cover code.

In one embodiment, the method further includes encoding the reference signal associated with the data information using the orthogonal cover code.

In one embodiment, the method further includes selecting the random access preamble from the plurality of random access preambles; determining the orthogonal cover cod, the cyclic shift and the time-frequency resource according to the random access preamble; encoding the data information using the orthogonal cover code; and encoding the reference signal associated with the data information using the cyclic shift.

In one embodiment, the method further includes selecting the random access preamble from the plurality of random access preambles; determining the cyclic shift, the time-frequency resource and a scrambling code according to the random access preamble; scrambling the data information using the scrambling code; and encoding the reference signal associated with the data information using the cyclic shift.

In one embodiment, the method further includes determining a maximum multiplexing level according to configuration information of the random accessing; determining a transmission power boost of the data according to the maximum multiplexing level.

In one embodiment, a power offset for the transmission power boost is configured by a system message, or is predefined.

In one embodiment, a relationship between the random access preamble and one or more of the orthogonal cover code, the cyclic shift, the time-frequency resource and a scrambling code is/are predefined.

In one embodiment, a minimum distance between two adjacent cyclic shifts is configured to be maximized.

In a second aspect, there is provided a method for two-step random accessing. The method includes receiving, by a network device from a terminal device, a random access preamble and a data block on a time-frequency resource; and transmitting, by the network device to the terminal device, a response message for the random accessing. The data block is encoded with an orthogonal cover code and/or a cyclic shift, and the data block comprises data information and a reference signal associated with the data information.

In one embodiment, the method further includes the random access preamble belongs to a plurality of random access preambles which are associated with the time-frequency resource for data.

In one embodiment, the method further includes determining a multiplexing level according to a detection of the random access preambles; and decoding the data information of multiple terminal devices according to the multiplexing level.

In a third aspect, there is provide a terminal device comprising a processor and a memory. The memory contains instructions executable by the processor whereby the terminal device is operative to transmit a random access preamble and a data block on a time-frequency resource to a network device; and receive a response message for random accessing from the network device. The data block is encoded with an orthogonal cover code and/or a cyclic shift, and the data block comprises data information and a reference signal associated with the data information.

In one embodiment, the random access preamble belongs to a plurality of random access preambles which are associated with the time-frequency resource for data.

In one embodiment, the terminal device is operative to select the random access preamble from the plurality of random access preambles; determine the orthogonal cover code and the time-frequency resource according to the random access preamble; and encode the data information using the determined orthogonal cover code.

In one embodiment, the terminal device is operative to encode the reference signal associated with the data information using the orthogonal cover code.

In one embodiment, the terminal device is operative to select the random access preamble from the plurality of random access preambles; determine the orthogonal cover cod, the cyclic shift and the time-frequency resource according to the random access preamble; encode the data information using the orthogonal cover code; and encode the reference signal associated with the data information using the cyclic shift.

In one embodiment, the terminal device is operative to select the random access preamble from the plurality of random access preambles; determine the cyclic shift, the time-frequency resource and a scrambling code according to the random access preamble; scramble the data information using the scrambling code; and encode the reference signal associated with the data information using the cyclic shift.

In one embodiment, the terminal device is operative to determine a maximum multiplexing level according to configuration information of the random accessing;

determine a transmission power boost of the data according to the maximum multiplexing level.

In one embodiment, a power offset for the transmission power boost is configured by a system message, or is predefined.

In one embodiment, a relationship between the random access preamble and one or more of the orthogonal cover code, the cyclic shift, the time-frequency resource and a scrambling code is/are predefined.

In one embodiment, a minimum distance between two adjacent cyclic shifts is configured to be maximized.

In a fourth aspect, there is provided a network device comprising a processor and a memory. The memory contains instructions executable by the processor whereby the network device is operative to receive a random access preamble and a data block on a time-frequency resource from a terminal device; and transmit a response message for the random accessing to the terminal device. The data block is encoded with an orthogonal cover code and/or a cyclic shift, and the data block comprises data information and a reference signal associated with the data information.

In one embodiment, the random access preamble belongs to a plurality of random access preambles which are associated with the time-frequency resource for data.

In one embodiment, the network device is operative to determine a multiplexing level according to a detection of the random access preambles; and decode the data information of multiple terminal devices according to the multiplexing level.

In a fifth aspect, there is provided a communications system. The system includes a terminal device and a network device; the terminal device is configured to transmit a random access preamble and a data block on a time-frequency resource to the network device; and the network device is configured to transmit a response message for random accessing. The data block is encoded with an orthogonal cover code and/or a cyclic shift, and the data block comprises data information and a reference signal associated with the data information.

According to various embodiments of the present disclosure, data of one or more terminal devices may be multiplexed in a time-frequency resource with OCC and/or CS within a two-step RA procedure. Therefore, resource efficiency is improved significantly for an associated data message following a random access preamble with endurable minor performance degradation.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
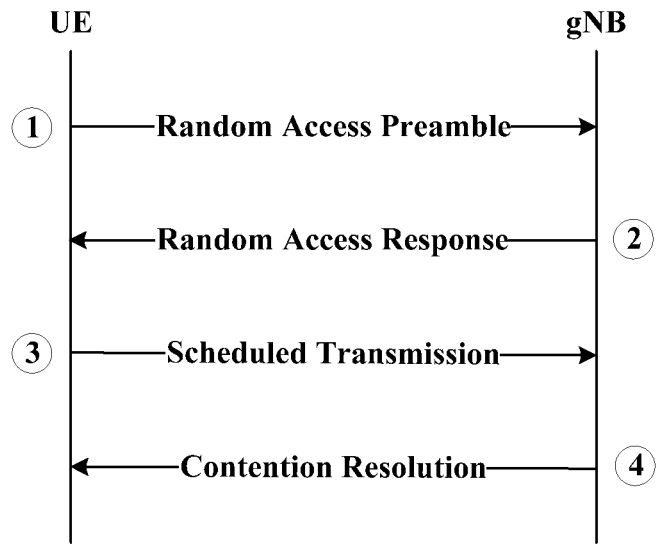
FIG. 1 is a diagram which shows four-step RA procedure.
Figure 2:
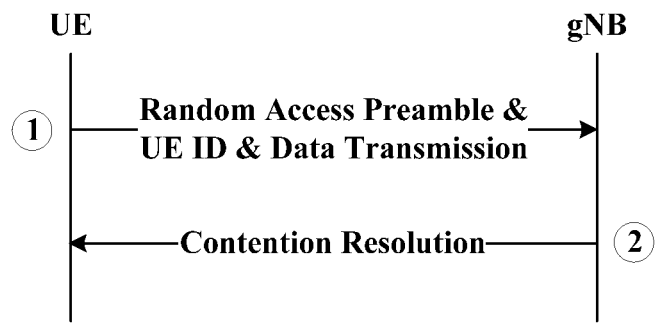
FIG. 2 is a diagram which shows two-step RA procedure.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth.

Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Now some exemplary embodiments of the present disclosure will be described below with reference to the figures.

Figure 4:
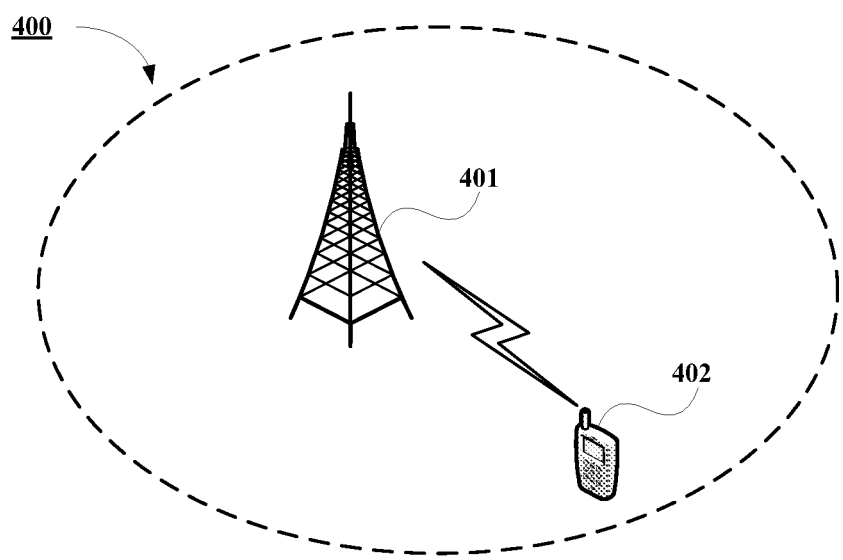
FIG. 4 is a schematic diagram which shows a wireless communication network.

FIG. 4 shows a schematic diagram of a wireless communication network 400. As shown in FIG. 4, it illustrates a network device 401 and a terminal device 402 in the wireless communication network. In the example of FIG. 4, the network device 401 may provide services to the terminal device 402. The traffic between the network device 401 and the terminal device 402 may be URLLC (ultra-reliable and low latency communication) traffic, eMBB (enhanced mobile broadband) traffic, mMTC (massive machine type communication) traffic, and so on.

It is to be understood that the configuration of FIG. 4 is described merely for the purpose of illustration, without suggesting any limitation as to the scope of the present disclosure. Those skilled in the art would appreciate that the wireless communication network 400 may include any suitable number of terminal devices and/or network devices and may have other suitable configurations.

In this disclosure, considering the two-step RA procedure is mainly used in a cell with small coverage and good fallback solution from two-step RA to four-step RA, it gives room for multiplexing of data of multiple UEs in a same time-frequency resource. By reserving less data resources and enhancing the multiplexing of the data following the PRACH preamble, the utilization efficiency of the reserved data resources can be clearly improved and more resources can be saved for regular service data transmission.

According to such multiplexing, different data could be multiplexed over one resource using such as OCCs, CSs and scrambling codes. Considering the two-step RA procedure is mainly used for small cell coverage and it is usually in good radio condition, there is still high probability to correctly decode the multiplexed data.

First Aspect of Embodiments

A method for two-step random accessing is provided in an embodiment. The method is implemented at a terminal device as an example.

Figure 5:
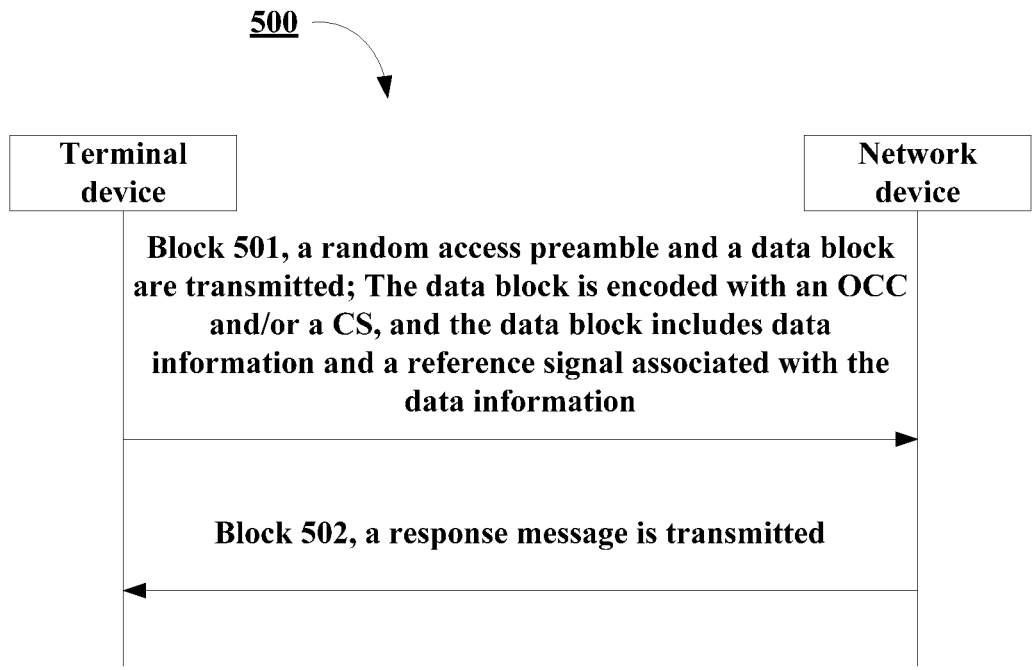
FIG. 5 is a diagram which shows a method for two-step random accessing in accordance with an embodiment of the present disclosure.

FIG. 5 is a diagram which shows a method 500 for two-step random accessing in accordance with an embodiment of the present disclosure, and illustrates the method for two-step random accessing by taking a terminal device as an example.

As shown in FIG. 5, the method 500 includes transmitting, by a terminal device to a network device, a random access preamble and a data block at block 501. The data block is encoded with an orthogonal cover code and/or a cyclic shift, and the data block includes data information and a reference signal associated with the data information.

As shown in FIG. 5, the method 500 further includes receiving, by the terminal device from the network device, a response message for the two-step random accessing at block 502.

In an embodiment, the random access preamble belongs to a plurality of random access preambles which are associated with the time-frequency resource.

For example, N random access preambles and M time-frequency resources are preconfigured for the two-step random accessing, where M<N; and each preconfigured time-frequency resource is corresponding to a plurality of preconfigured random access preambles.

Figure 6:
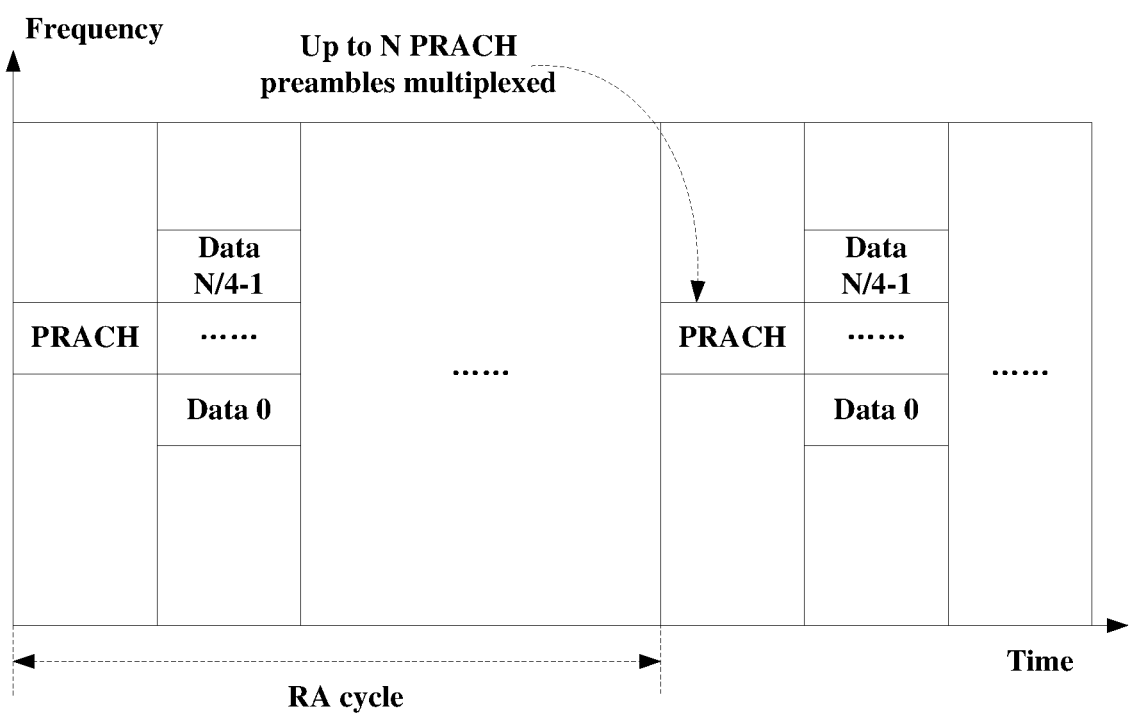
FIG. 6 is a diagram which shows an example in two-step RA procedure in accordance with an embodiment of the present disclosure.

FIG. 6 is a diagram which shows an example in two-step RA procedure in accordance with an embodiment of the present disclosure. As shown in FIG. 6, data blocks from up to 4 different terminal devices can be multiplexed over one block of time-frequency resource.

Figure 3:
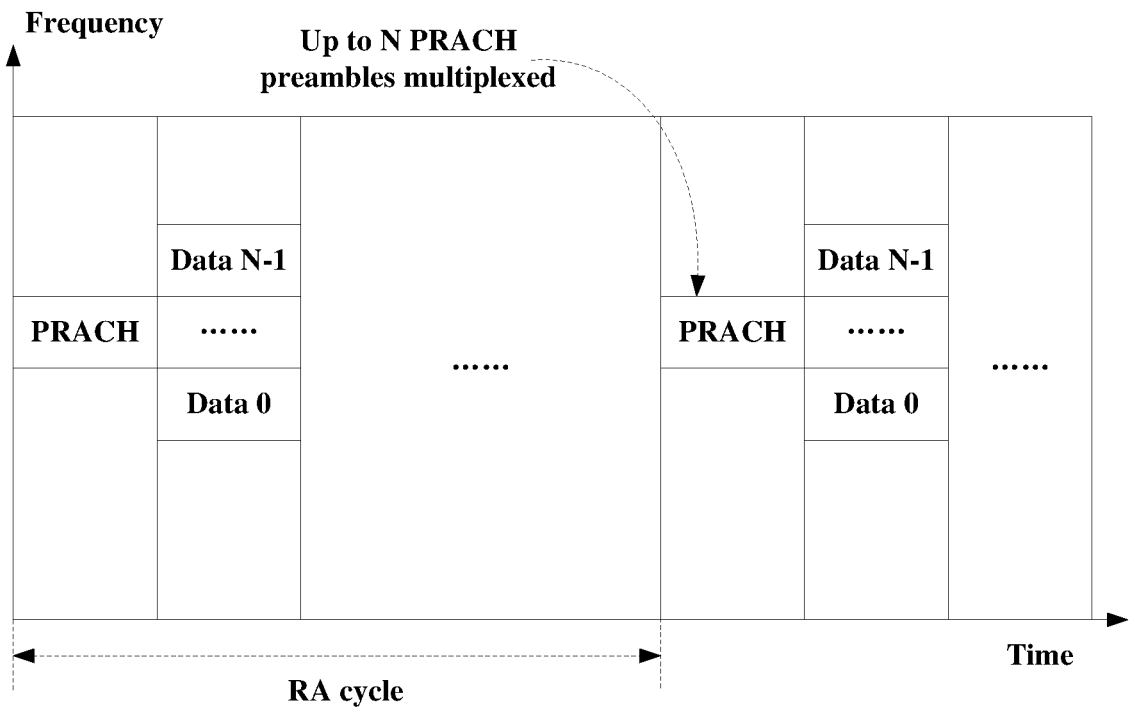
FIG. 3 is a diagram which shows an example of step 1 in the two-step RA procedure.

Compared to the FIG. 3, the block number of reserved data resources is decreased from N to N/4 (assuming N is integer times of 4).

For example, if there are 64 PRACH preambles configured for the two-step random accessing, only 16 blocks of time-frequency resources need to be reserved to be associated with the 64 PRACH preambles.

In an embodiment, a relationship between a random access preamble and one or more of the OCC, the CS, a block of time-frequency resource and a scrambling code is/are predefined.

For example, there are four relationships, such as relationship 1 between the random access preamble and the OCC, relationship 2 between the random access preamble and the CS, relationship 3 between the random access preamble and the block of time-frequency resource, relationship 4 between the random access preamble and the scrambling code. Part or all of the four relationships is/are predefined.

Figure 7:
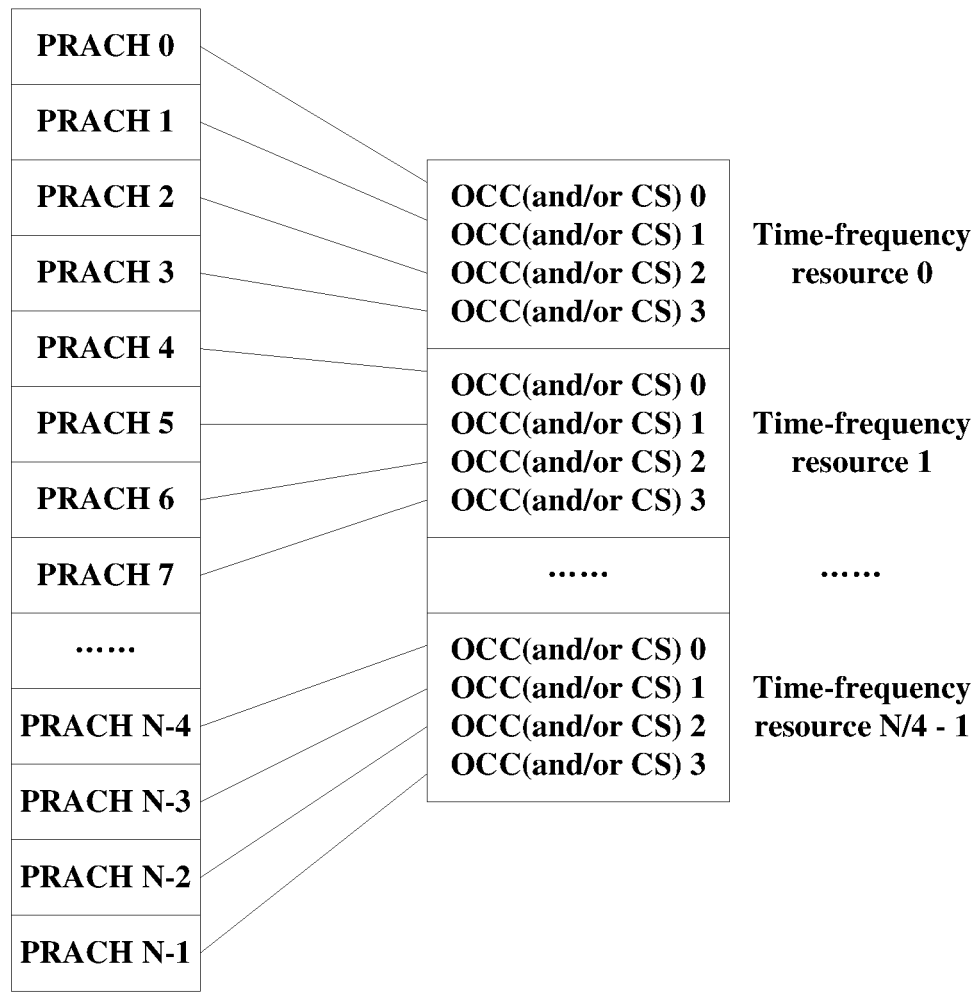
FIG. 7 is a diagram which shows an example of the relationship between the preambles and data resources in accordance with an embodiment of the present disclosure.

FIG. 7 is a diagram which shows an example of the relationship between the preambles and data resources in accordance with an embodiment of the present disclosure.

As shown in FIG. 7, it is assumed up to 4 different data blocks from different terminal devices can be multiplexed using OCCs and/or CSs.

For example, when a PRACH preamble 2 is randomly selected by a terminal device 1, then the time-frequency resource 0 is determined to transmit a data block of the terminal device 1. Furthermore, OCC (and/or CS) 2 is/are determined to be applied on the data block of the terminal device 1.

It should be appreciated that the OCC and/or CS is/are only an example in this disclosure, but it is not limited thereto, other codes may also be further adopted, such as a scrambling code for data information included in the data block. Furthermore, the reference signal associated with the data information may be a de-modulation reference signal (DM-RS), but it is not limited thereto, other reference signals may also be adopted.

In an embodiment, OCC may be adopted to enable the multiplexing of data of different terminal devices.

Figure 8:
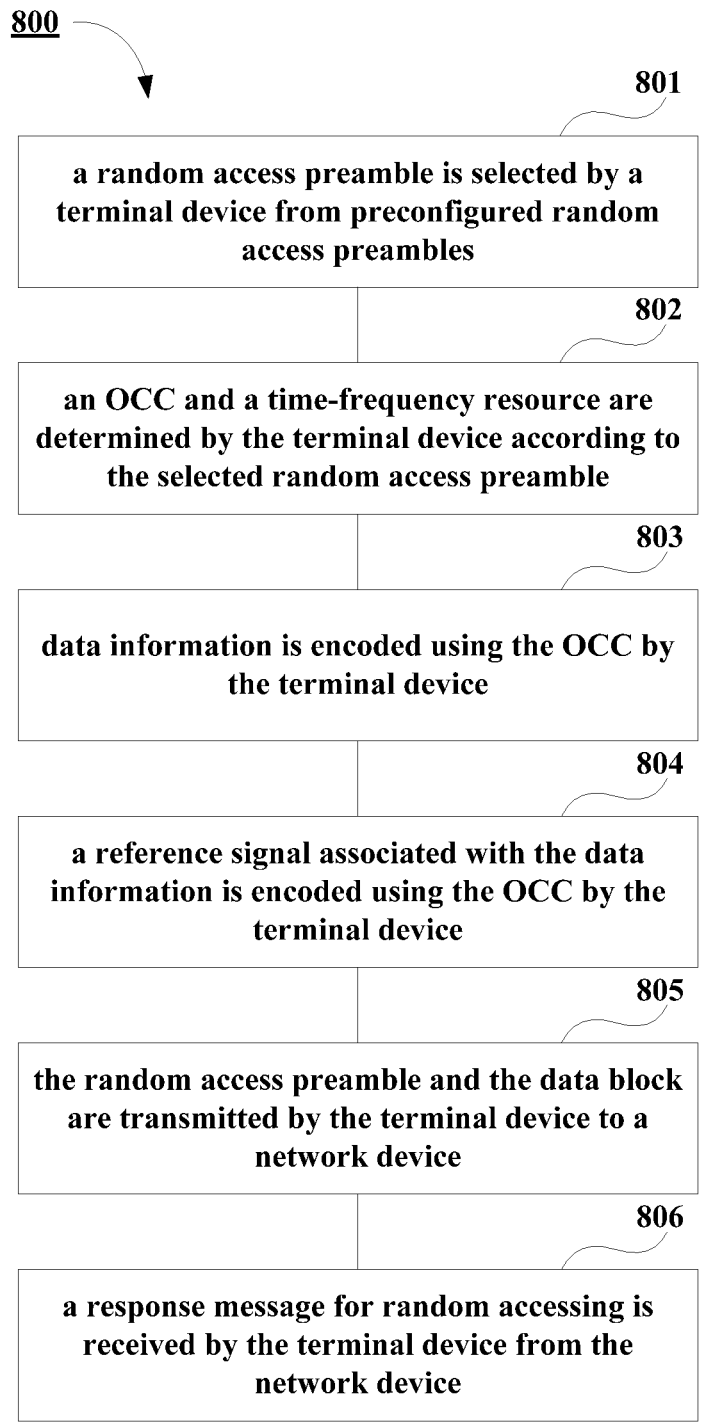
FIG. 8 is another diagram which shows a method for random accessing in accordance with an embodiment of the present disclosure.

FIG. 8 shows a diagram of random accessing in accordance with an embodiment of the present disclosure, and illustrates the method for random accessing from a viewpoint of a terminal device.

As shown in FIG. 8, the method 800 is entered at block 801, in which a random access preamble is selected by the terminal device from preconfigured random access preambles. At block 802, an OCC and a block of time-frequency resource are determined by the terminal device according to the selected random access preamble.

As shown in FIG. 8, at block 803, in which data information is encoded using the OCC by the terminal device. At block 804, a reference signal, such as a de-modulation reference signal (DM-RS), associated with the data information is encoded using the OCC by the terminal device. It is noted that there is no requirement to the sequence of block 804 and block 803.

As shown in FIG. 8, at block 805, in which the random access preamble and the encoded data block are transmitted by the terminal device to a network device on the determined time-frequency resource. At block 806, a response message for random accessing is received by the terminal device from the network device.

It should be appreciated that FIG. 8 is only an example of the disclosure, but it is not limited thereto. For example, the order of operations at blocks 801-806 may be adjusted and/or some blocks may be omitted. Moreover, some blocks not shown in FIG. 8 may be added.

Next the OCC is illustrated as an example in time domain and frequency domain.

Figure 9:
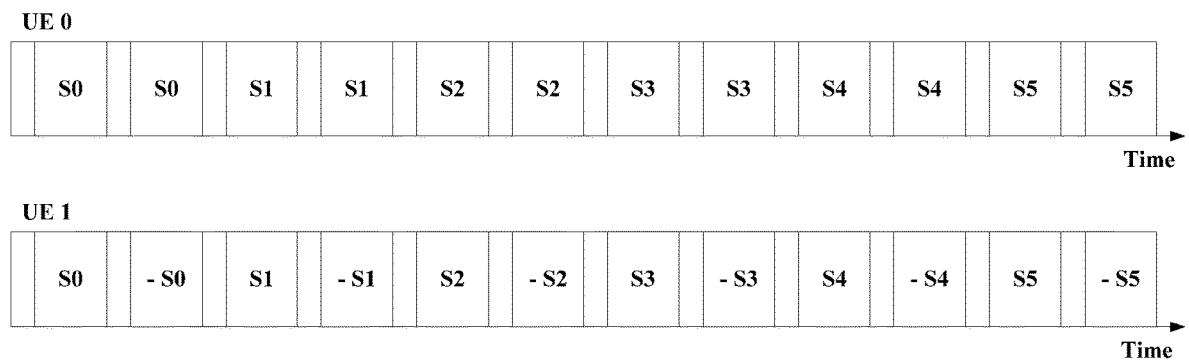
FIG. 9 is a diagram which shows an example of time domain format with the OCC of length 2 in accordance with an embodiment of the present disclosure.

FIG. 9 is a diagram which shows an example of time domain format with the OCC of length 2 in accordance with an embodiment of the present disclosure. As shown in FIG. 9, orthogonal frequency division multiplexing (OFDM) symbols transmitted from UE 0 are not the same as the OFDM symbols transmitted from UE 1.

For UE 0, $W_0$=[1 1] is used in time domain and for UE 1, $W_1$=[1 −1] is used in time domain. As shown in FIG. 9, for UE 0, the OFDM symbols are added pairwise in order to suppress transmitted signal from UE 1. In the same manner, the difference is taken between pairwise OFDM symbols for UE 1.

For each UE, only half number of different OFDM symbols, numbered as S0 to S6, are used to transmit the different data information for each UE as compared to that not using OCC. On the other hand, the received signal to noise ratio is increased by approximately 3 dB by adding (or subtracting) OFDM symbols pairwise.

For example, an OCC of length 2 may be with the following weight factors: $W_0$=[1 1] and $W_1$=[1 −1]. an OCC of length 3 may be with the following weight factors:

$$W_0 = [\,1\ \ 1\,],\ W_1 = \left[\,1\ \ e^{\frac{j2\pi}{3}}\ \ e^{2\frac{j2\pi}{3}}\,\right]\ \text{and}\ W_2 = \left[\,1\ \ e^{2\frac{j2\pi}{3}}\ \ e^{2*2\frac{j2\pi}{3}}\,\right].$$

In general, an OCC number k of length N can be constructed by $$W_k = \left[\,1\ \ e^{k\frac{j2\pi}{N}}\ \ \ldots\ \ e^{(N-1)*k*\frac{j2\pi}{N}}\,\right]$$

Figure 10:
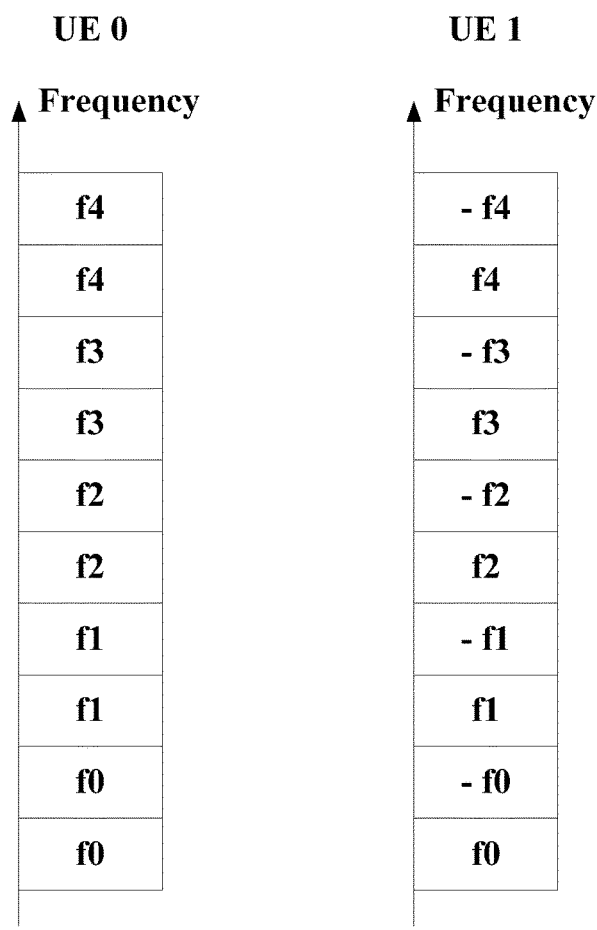
FIG. 10 is a diagram which shows an example of frequency domain format with the OCC of length 2 in accordance with an embodiment of the present disclosure.

FIG. 10 is a diagram which shows an example of frequency domain format with the OCC of length 2 in accordance with an embodiment of the present disclosure. As shown in FIG. 10, subcarriers transmitted from UE 0 are not the same as the subcarriers transmitted from UE 1.

For UE 0, $W_0$=[1 1] is used in frequency domain and For UE 1, $W_1$=[1 −1] is used in frequency domain. As shown in FIG. 10, for UE 0, the subcarriers are added pairwise in order to suppress interference from UE 1. In the same manner, the difference is taken between pairwise subcarriers for UE 1.

It should be appreciated that a longer OCC in frequency domain may also be possible. Furthermore, a frequency domain OCC may be combined with a time domain OCC.

With frequency offsets or time varying channels, the interference between terminal devices is increased when using the time domain OCC. This interference increases with the length of the OCC. Thus, in scenarios with high speed or large frequency offsets, a shorter, or no time domain OCC may be used. In the same manner, the length of the frequency domain OCC may not be too long since a channel which is frequency selective will introduce interference between the terminal devices.

Also, depending on reliability requirements, the OCC length in both time domain and frequency domain can be adjusted. For example, in ultra-high reliability use cases, the use of OCC may be avoided unless the channel is very slow time varying and the frequency offset is very small.

In an embodiment, the use of the OCC, or the length of the OCC may be configured by a control channel before starting the 2-step RA procedure. This control channel may be a physical broadcast control channel (PBCH).

In an embodiment, CS may be adopted to enable the multiplexing of data of different terminal devices.

Figure 11:
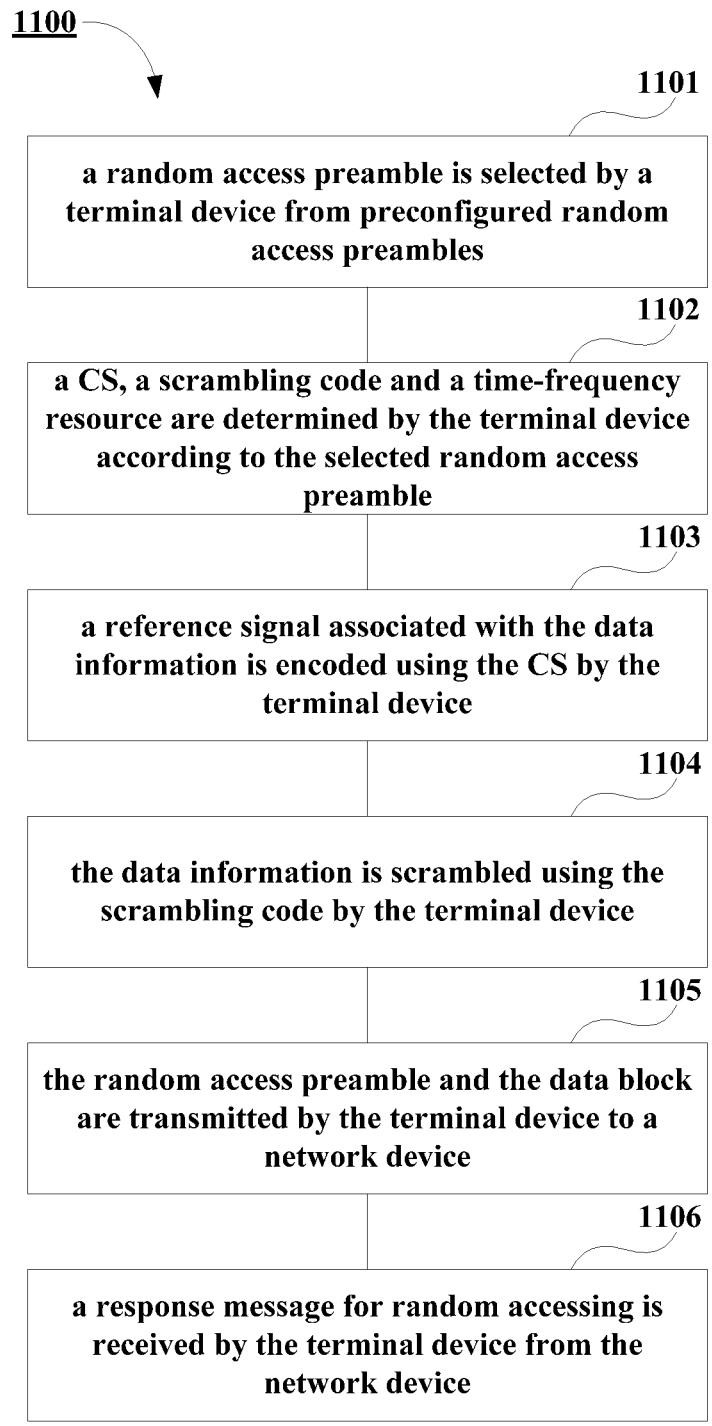
FIG. 11 is another diagram which shows a method for random accessing in accordance with an embodiment of the present disclosure.

FIG. 11 shows another diagram of random accessing in accordance with an embodiment of the present disclosure, and illustrates the method for random accessing from a viewpoint of a terminal device.

As shown in FIG. 11, the method 1100 is entered at block 1101, in which a random access preamble is selected by the terminal device from preconfigured random access preambles. At block 1102, a CS, a scrambling code and a block of time-frequency resource are determined by the terminal device according to the selected random access preamble.

As shown in FIG. 11, at block 1103, in which a reference signal (such as DM-RS) associated with data information included in a data block to be transmitted following the selected preamble is encoded with the cyclic shift by the terminal device. At block 1104, the data information is scrambled using the scrambling code by the terminal device.

As shown in FIG. 11, at block 1105, in which the random access preamble and the data block are transmitted by the terminal device to a network device. At block 1106, a response message for random accessing is received by the terminal device from the network device. For example, the UE ID of the terminal device is included in the response as an indication of access grant by the network device.

It should be appreciated that FIG. 11 is only an example of the disclosure, but it is not limited thereto. For example, the order of operations at blocks 1101-1106 may be adjusted and/or some blocks may be omitted. Moreover, some blocks not shown in FIG. 11 may be added.

As an improvement, a minimum distance between two adjacent cyclic shifts may be configured to be maximized. That is to say, when multiple CSs are used for enabling the multiplexing of data blocks from different UEs, the minimum distance between selected CSs may be maximized to mitigate possible interference.

For instance, if there are 12 candidate CSs as in LTE and data blocks of up to 4 different terminal devices can be multiplexed using different CSs, the network configures up to 4 terminal devices to use CSs with index 0, 3, 6, 9.

In an embodiment, a set of scrambling codes may be predefined. The set size may be equal to a maximum multiplexing level. For PRACHs whose corresponding data transmission are multiplexed over one block of time-frequency resource, there is one to one mapping between the PRACH preambles and the scrambling codes. Once a PRACH preamble is selected by a terminal device for 2-step RA procedure, the CS for DMRS and the scrambling code for scrambling data information can also be determined accordingly. The terminal device may use the determined CS for DMRS encoding and the determined scrambling code for data scrambling.

In another embodiment, CS and OCC may be adopted to enable the multiplexing of data of different terminal devices.

Figure 12:
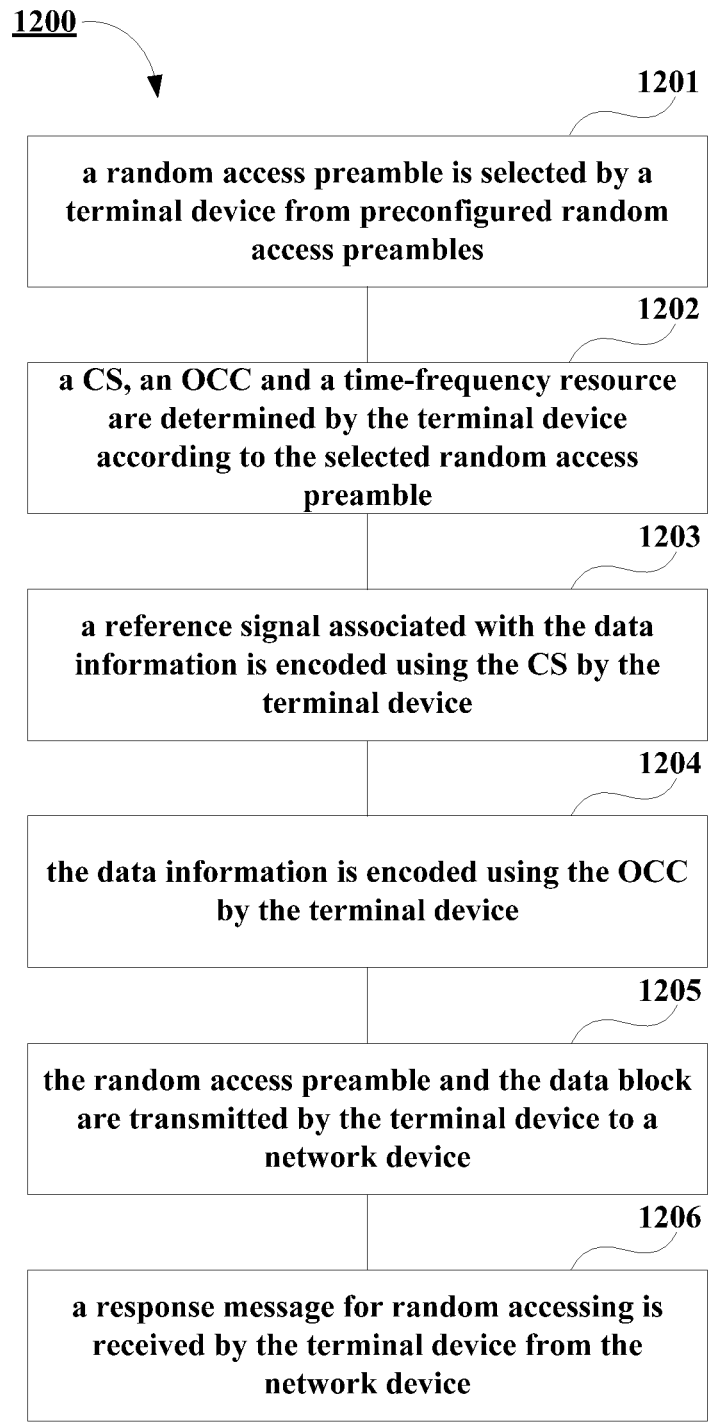
FIG. 12 is another diagram which shows a method for random accessing in accordance with an embodiment of the present disclosure.

FIG. 12 shows another diagram of random accessing in accordance with the embodiment of the present disclosure, and illustrates the method for random accessing from a viewpoint of a terminal device.

As shown in FIG. 12, the method 1200 is entered at block 1201, in which a random access preamble is selected by the terminal device from preconfigured random access preambles. At block 1202, a CS, an OCC and a time-frequency resource are determined by the terminal device according to the selected random access preamble.

As shown in FIG. 12, at block 1203, in which a reference signal (such as DM-RS) associated with data information included in a data block to be transmitted is encoded with the CS by the terminal device. At block 1204, the data information is encoded using the OCC by the terminal device.

As shown in FIG. 12, at block 1205, in which the random access preamble and the data block are transmitted by the terminal device to a network device. At block 1206, a response message for random accessing is received by the terminal device from the network device.

It should be appreciated that FIG. 12 is only an example of the disclosure, but it is not limited thereto. For example, the order of operations at blocks 1201-1206 may be adjusted and/or some blocks may be omitted. Moreover, some blocks not shown in FIG. 11 may be added.

In this embodiment, for example, the DMRS of the associated data may be encoded with the CS and the data information may be encoded with the OCC to provide orthogonality with data block from other possible terminal device. According to the predefined mapping relationship between the PRACH preamble to the CS and OCC, the terminal device can determine the CS and OCC once the PRACH preamble is randomly selected. The network device may firstly detect the PRACH preamble, and then according to the mapping between the PRACH preamble to OCC and CS, the network device can decode the data block.

A maximum multiplexing level may be determined by the terminal device according to configuration information of the two-step random accessing.

In an embodiment, transmission power boost of the data block to be transmitted may be determined by the terminal device according to the maximum multiplexing level (i.e. the maximum number of data blocks multiplexed over a block of time-frequency resource).

In this embodiment, power boost table can be pre-configured for the data block transmission according to the maximum multiplexing level. For example, higher multiplexing level requires larger power boost. After maximum multiplexing level is determined, the terminal device determine power offset for power boost according to the maximum multiplexing level by looking up the table. After then, the power offset for the transmission power boost is applied for transmission.

Alternatively, power offset for the transmission power boost may be configured by a system message to the terminal device without firstly determining the maximum multiplexing level by the terminal device.

As can be seen from the above embodiments, data blocks of two more terminal devices are enabled to be multiplexed in a time-frequency resource with OCC and/or CS in step 1 of a two-step RA procedure. Therefore, resource efficiency is improved significantly for an associated data message following a random access preamble with endurable minor performance degradation.

Second Aspect of Embodiments

A method for two-step random accessing is provided in an embodiment. The method is implemented at a network device as an example, and the same contents as those in the first aspect of embodiments are omitted.

Figure 13:
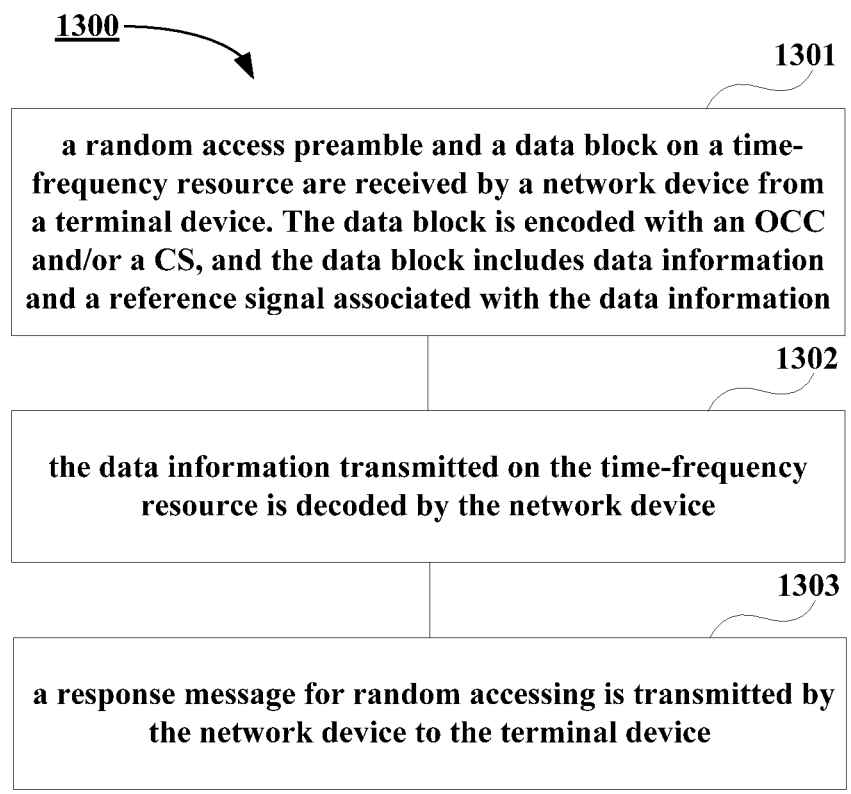
FIG. 13 is another diagram which shows a method for random accessing in accordance with an embodiment of the present disclosure.

FIG. 13 shows a flowchart of a method 1300 for two-step random accessing in accordance with an embodiment of the present disclosure, and illustrates the method for two-step random accessing by taking a network device as an example.

As shown in FIG. 13, the method 1300 includes receiving, by a network device from a terminal device, a random access preamble and a data block on a block of time-frequency resource at block 1301. The data block is encoded with an orthogonal cover code and/or a cyclic shift, and the data block comprises data information and a reference signal associated with the data information.

As shown in FIG. 13, the method 1300 further includes decoding, by the network device, the data information transmitted on the time-frequency resource at block 1302; and transmitting, by the network device to the terminal device, a response message for random accessing at block 1303.

In an embodiment, the random access preamble belongs to a plurality of random access preambles which are associated with the time-frequency resource for data.

For example, N random access preambles and M time-frequency resources are preconfigured for random accessing, where M<N; and each block of preconfigured time-frequency resource is corresponding to a plurality of preconfigured random access preambles.

In an embodiment, a multiplexing level is determined by the network device according to a detection of the random access preamble; and data blocks of the different terminal devices can be decoded by the network device with the help of the multiplexing level.

For example, a proper receiving scheme, such as MRC (Maximum Ratio Combining), IRC (Interference Rejection Combining), MUD (Multiple Users Detection), SIC (Serial Interference Cancellation) schemes, can be conditionally selected for decoding the associated data according to the multiplexing level determined based on the detection of PRACH preambles.

If multiple preambles with data blocks multiplexed over a same block of time frequency resource are detected, an advanced receiving scheme with good interference suppression/cancellation performance can be used, such as MUD or SIC. If only one data block is transmitted over the block of time-frequency resource, a simple receiving scheme can be used, such as MRC or IRC.

For example, the network device detects that there are two random access preambles in a PRACH slot, the network device determines the multiplexing level is 2. Therefore, the MUD or SIC may be adopted to de-multiplex the data.

It should be appreciated that the multiplexing level is only an example of the disclosure, but it is not limited thereto. For example, the network device may decode the data information without the multiplexing level.

As can be seen from the above embodiments, with the handling of the received random access preamble and data block by the network device, multiplexed data blocks of two or more terminal devices transmitted in a same block of time-frequency resource with OCC and/or CS can be decoded within a two-step RA procedure. Therefore, resource efficiency is improved significantly for an associated data message following a random access preamble with endurable minor performance degradation.

Third Aspect of Embodiments

An apparatus for two-step random accessing is provided in an embodiment. The apparatus may be configured in the terminal device 402, and the same contents as those in the first aspect of embodiments are omitted.

Figure 14:
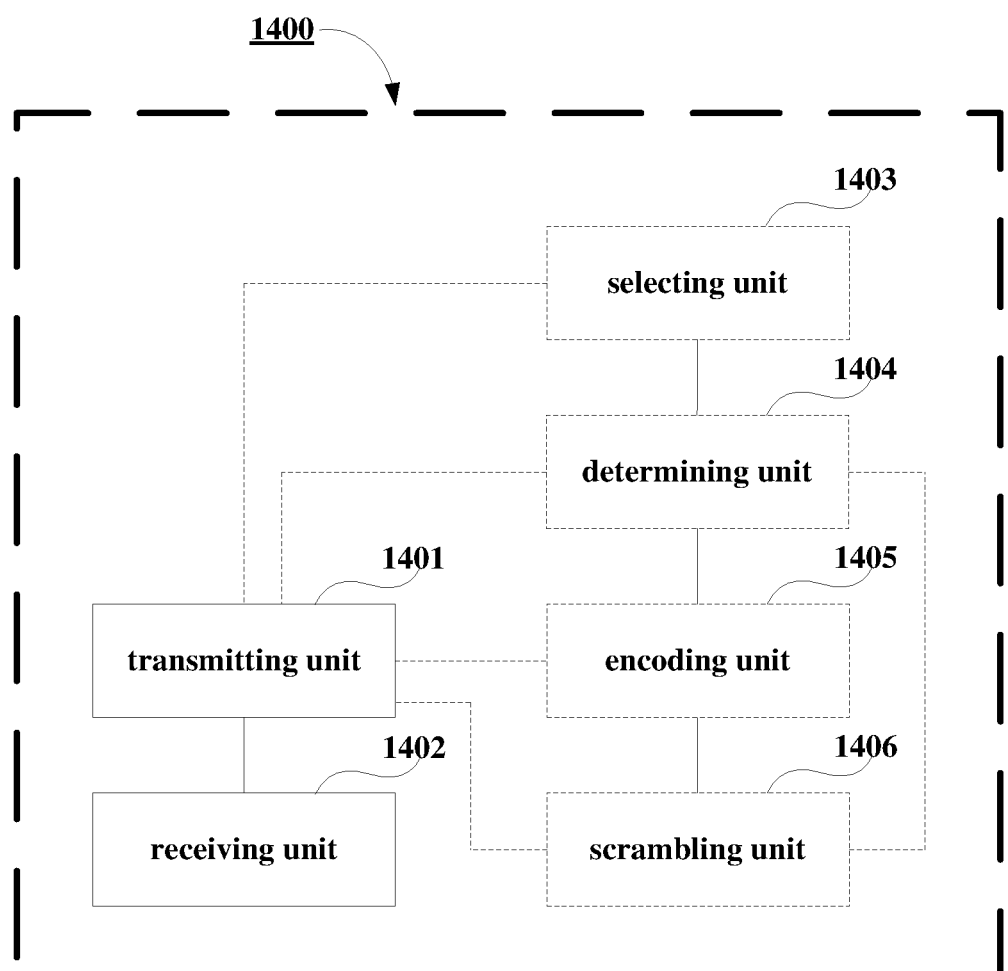
FIG. 14 is a block diagram which shows an apparatus for two-step random accessing in accordance with an embodiment of the present disclosure.

FIG. 14 shows a block diagram of an apparatus 1400 for two-step random accessing in accordance with an embodiment of the present disclosure.

As shown in FIG. 14, the apparatus 1400 includes a transmitting unit 1401 configured to transmit a random access preamble and a data block on a block of time-frequency resource to a network device; and a receiving unit 1402 configured to receive a response message for random accessing from the network device. The data block is encoded with an orthogonal cover code and/or a cyclic shift, and the data block comprises data information and a reference signal associated with the data information.

In an embodiment, the random access preamble belongs to a plurality of random access preambles which are associated with the time-frequency resource for data.

For example, N random access preambles and M time-frequency resources are preconfigured for random accessing, where M<N; and each preconfigured time-frequency resource is corresponding to a plurality of preconfigured random access preambles.

As shown in FIG. 14, the apparatus 1400 may further include a selecting unit 1403 configured to select the random access preamble from preconfigured random access preambles; a determining unit 1404 configured to determine the orthogonal cover code and the time-frequency resource according to the selected random access preamble; and an encoding unit 1405 configured to encode the data information using the orthogonal cover code.

In an embodiment, the encoding unit 1405 is further configured to encode the reference signal associated with the data information using the orthogonal cover code.

In an embodiment, the selecting unit 1403 is further configured to select the random access preamble from preconfigured random access preambles; the determining unit 1404 is further configured to determine the orthogonal cover code, the cyclic shift and the time-frequency resource according to the selected random access preamble.

In this embodiment, the encoding unit 1405 is further configured to encode the data information using the orthogonal cover code. the encoding unit 1405 is further configured to encode the reference signal associated with the data information using the cyclic shift.

In an embodiment, the selecting unit 1403 is further configured to select the random access preamble from preconfigured random access preambles; the determining unit 1404 is further configured to determine the cyclic shift, the time-frequency resource and a scrambling code according to the selected random access preamble. The encoding unit 1405 is further configured to the reference signal associated with the data information using the cyclic shift.

As shown in FIG. 14, the apparatus 1400 may further include a scrambling unit 1406 configured to scramble the data information using the scrambling code.

In an embodiment, a maximum multiplexing level may be determined by the terminal device according to configuration information of the two-step random accessing; and a transmission power boost of the data may be determined by the terminal device according to the maximum multiplexing level.

In this embodiment, a power offset for the transmission power boost may be configured by a system message, or may be predefined.

In an embodiment, a relationship between the random access preamble and one or more of the orthogonal cover code, the cyclic shift, the time-frequency resource and a scrambling code is/are predefined.

In an embodiment, a minimum distance between two adjacent cyclic shifts is configured to be maximized.

It should be appreciated that components included in the apparatus 1400 correspond to the operations of the method 500, 800, 1100 or 1200. Therefore, all operations and features described above with reference to FIG. 5, 8, 11 or 12 are likewise applicable to the components included in the apparatus 1400 and have similar effects. For the purpose of simplification, the details will be omitted.

It should be appreciated that the components included in the apparatus 1400 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 1400 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 1400 may be a part of a device. But it is not limited thereto, for example, the apparatus 1400 may be the terminal device 402, other parts of the terminal device 402, such as transmitter and receiver, are omitted in the FIG. 14.

As can be seen from the above embodiments, data of one or more terminal devices may be multiplexed in a time-frequency resource with OCC and/or CS within a two-step RA procedure. Therefore, resource efficiency is improved significantly for an associated data message following a random access preamble with endurable minor performance degradation.

Fourth Aspect of Embodiments

An apparatus for two-step random accessing is provided in an embodiment. The apparatus may be configured in the network device 401, and the same contents as those in the first or second aspect of embodiments are omitted.

Figure 15:
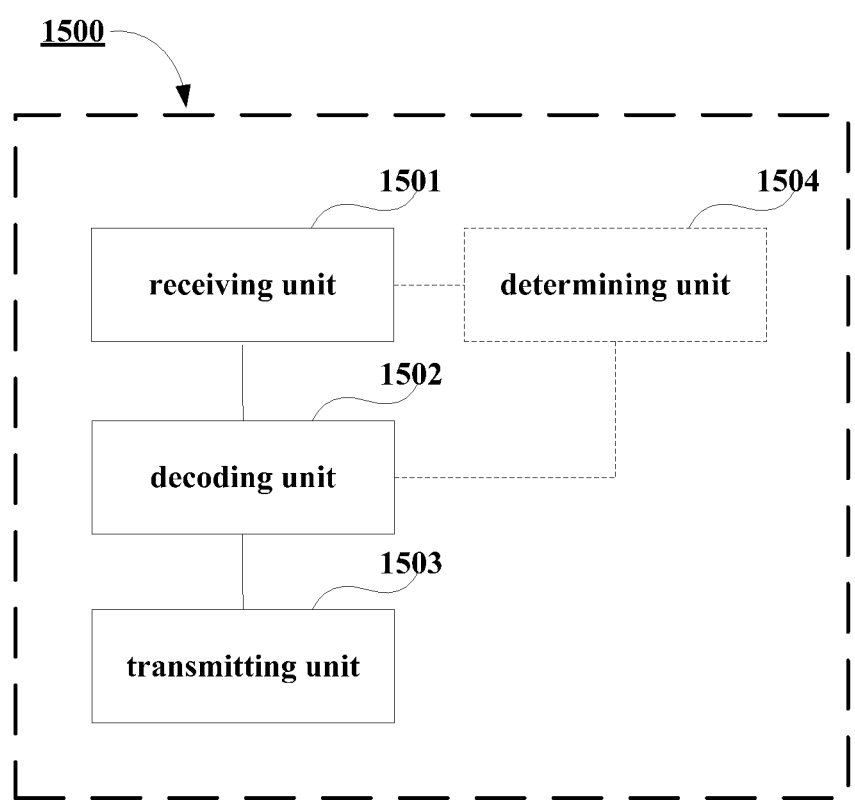
FIG. 15 is a block diagram which shows an apparatus for two-step random accessing in accordance with an embodiment of the present disclosure.

FIG. 15 shows a block diagram of an apparatus 1500 for two-step random accessing in accordance with an embodiment of the present disclosure.

As shown in FIG. 15, the apparatus 1500 includes a receiving unit 1501 configured to receive a random access preamble and a data block on a block of time-frequency resource from a terminal device; a decoding unit 1502 configured to decode the data information transmitted on the time-frequency resource; and a transmitting unit 1503 configured to transmit a response message for the random accessing to the terminal device. The data block is encoded with an orthogonal cover code and/or a cyclic shift, and the data block comprises data information and a reference signal associated with the data information.

In an embodiment, the random access preamble belongs to a plurality of random access preambles which are associated with the time-frequency resource for data.

In an embodiment, as shown in FIG. 15, the apparatus 1500 may further include a determining unit 1504 configured to determine a multiplexing level according to a detection of the random access preambles.

It should be appreciated that components included in the apparatus 1500 correspond to the operations of the method 1300. Therefore, all operations and features described above with reference to FIG. 13 are likewise applicable to the components included in the apparatus 1500 and have similar effects. For the purpose of simplification, the details will be omitted.

It should be appreciated that the components included in the apparatus 1500 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 1500 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 1500 may be a part of a device. But it is not limited thereto, for example, the apparatus 1500 may be the network device 401, other parts of the network device 401, such as transmitter and receiver, are omitted in the FIG. 15.

As can be seen from the above embodiments, data of one or more terminal devices may be multiplexed in a time-frequency resource with OCC and/or CS within a two-step RA procedure. Therefore, resource efficiency is improved significantly for an associated data message following a random access preamble with endurable minor performance degradation.

Fifth Aspect of Embodiments

A communications system is provided, as shown in FIG. 4, the communication system 400 includes a terminal device 402 configured to transmit a random access preamble and a data block on a time-frequency resource and a network device 401 configured to transmit a response message for random accessing.

The data block is encoded with an orthogonal cover code and/or a cyclic shift, and the data block comprises data information and a reference signal associated with the data information.

A device (such as a terminal device 402 or a network device 401) is provided in an embodiment, and the same contents as those in the first aspect and the second aspect of embodiments are omitted.

Figure 16:
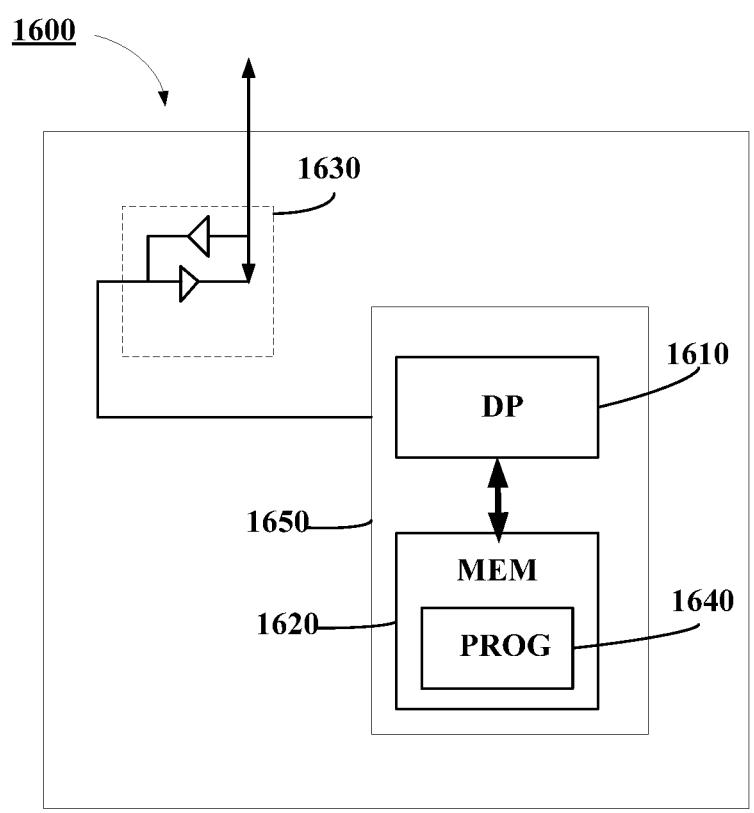
FIG. 16 is a simplified block diagram of a device that is suitable for implementing embodiments of the present disclosure.

FIG. 16 shows a simplified block diagram of a device 1600 that is suitable for implementing embodiments of the present disclosure. It would be appreciated that the device 1600 may be implemented as at least a part of, for example, the network device 401 or the terminal device 402.

As shown, the device 1600 includes a communicating means 1630 and a processing means 1650. The processing means 1650 includes a data processor (DP) 1610, a memory (MEM) 1620 coupled to the DP 1610. The communicating means 1630 is coupled to the DP 1610 in the processing means 1650. The MEM 1620 stores a program (PROG) 1640. The communicating means 1630 is for communications with other devices, which may be implemented as a transceiver for transmitting/receiving signals.

In some embodiments where the device 1600 acts as a network device. For example, the memory 1620 stores a plurality of instructions; and the processor 1610 coupled to the memory 1620 and configured to execute the instructions to: receive a random access preamble and a data block on a time-frequency resource from a terminal device; and transmit a response message for the random accessing to the terminal device. The data block is encoded with an orthogonal cover code and/or a cyclic shift, and the data block comprises data information and a reference signal associated with the data information.

In some other embodiments where the device 1600 acts as a terminal device. For example, the memory 1620 stores a plurality of instructions; and the processor 1610 coupled to the memory 1620 and configured to execute the instructions to: transmit a random access preamble and a data block on a time-frequency resource to a network device; and receive a response message for the random accessing from the network device. The data block is encoded with an orthogonal cover code and/or a cyclic shift, and the data block comprises data information and a reference signal associated with the data information.

The PROG 1640 is assumed to include program instructions that, when executed by the associated DP 1610, enable the device 1600 to operate in accordance with the embodiments of the present disclosure, as discussed herein with the method 500 or 1300. The embodiments herein may be implemented by computer software executable by the DP 1610 of the device 1600, or by hardware, or by a combination of software and hardware. A combination of the data processor 1610 and MEM 1620 may form processing means 1650 adapted to implement various embodiments of the present disclosure.

The MEM 1620 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 1600, there may be several physically distinct memory modules in the device 1600. The DP 1610 may be of any type suitable to the local technical environment, and may include one or more of general purpose computers, special purpose computers, microprocessors, digital signal processors (DSPs) and processors based on multicore processor architecture, as non-limiting examples. The device 1600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of a terminal device to random accessing to a network, comprising:

transmitting, to a network device on a time-frequency resource, a random access preamble and a data block comprising data information and a reference signal associated with the data information, wherein the data information is encoded with a scrambling code and the reference signal is encoded with an orthogonal cover code (OCC) or a cyclic shift (CS); and receiving, from the network device, a response message for the random accessing.

2. The method of claim 1, wherein the random access preamble belongs to a plurality of random access preambles which are associated with the time-frequency resource for data.

3. The method of claim 2, further comprising:

selecting the random access preamble from the plurality of random access preambles;

determining the scrambling code according to the selected random access preamble;

determining the orthogonal cover code and the time-frequency resource according to the selected random access preamble; and encoding the data information using the determined scrambling code.

4. The method of claim 3, further comprising:

encoding the reference signal associated with the data information using the orthogonal cover code.

5. The method of claim 2, further comprising:

selecting the random access preamble from the plurality of random access preambles;

determining the orthogonal cover code, the cyclic shift and the time-frequency resource according to the selected random access preamble; and encoding the reference signal associated with the data information using the cyclic shift;

encoding the data information using the scrambling code.

6. The method of claim 2, further comprising:

the terminal device selecting the random access preamble from the plurality of random access preambles;

the terminal device determining the cyclic shift, the time-frequency resource and the scrambling code according to the selected random access preamble;

the terminal device encoding the reference signal associated with the data information using the cyclic shift; and the terminal device encoding the data information by scrambling the data information using the scrambling code.

7. The method of claim 1, further comprising:

determining a maximum multiplexing level according to configuration information of the random accessing;

determining a transmission power boost of the data according to the maximum multiplexing level.

8. The method of claim 7, wherein a power offset for the transmission power boost is configured by a system message, or is predefined.

9. The method of claim 1, wherein a relationship between the random access preamble and one or more of the orthogonal cover code, the cyclic shift, the time-frequency resource and the scrambling code is/are predefined.

10. The method of claim 1, wherein a minimum distance between two adjacent cyclic shifts is configured to be maximized.

11. A method performed by a network device, comprising:
receiving a random access preamble and a data block transmitted by a terminal device on a time-frequency resource, wherein the data block comprises data information and a reference signal associated with the data information, the data information is encoded with a scrambling code, and the reference signal associated with the data information is encoded with an orthogonal cover code and/or a cyclic shift;
decoding the data information transmitted on the time-frequency resource;
transmitting to the terminal device a response message.

12. The method of claim 11, wherein the random access preamble belongs to a plurality of random access preambles which are associated with the time-frequency resource for data.

13. The method of claim 11, wherein the method further comprising:
determining a multiplexing level according to a detection of the random access preambles.

14. A terminal device, comprising a processor and a memory, wherein the memory containing instructions executable by the processor whereby the terminal device is operative to:
transmit, to a network device on a time-frequency resource, a random access preamble and a data block comprising data information and a reference signal associated with the data information, wherein the data information is encoded with a scrambling code and the reference signal is encoded with an orthogonal cover code (OCC) or a cyclic shift (CS); and
receive, from the network device, a response message for the random accessing.

15. The terminal device of claim 14, wherein
the random access preamble belongs to a plurality of random access preambles which are associated with the time-frequency resource for data, and
the terminal device is further operative to:
select the random access preamble from the plurality of random access preambles;
determine the orthogonal cover code and the time-frequency resource according to the random access preamble;
encode the data information using the scrambling code; and
encode the reference signal associated with the data information using the orthogonal cover code.

16. The terminal device of claim 14, wherein
the random access preamble belongs to a plurality of random access preambles which are associated with the time-frequency resource for data, and
the terminal device is operative to:
select the random access preamble from the plurality of random access preambles;
determine the orthogonal cover code, the cyclic shift and the time-frequency resource according to the random access preamble;
encode the data information using the scrambling code; and
encode the reference signal associated with the data information using the cyclic shift.

17. The terminal device of claim 14, wherein
the random access preamble belongs to a plurality of random access preambles which are associated with the time-frequency resource for data, and
the terminal device is operative to:
select the random access preamble from the plurality of random access preambles;
determine the cyclic shift, the time-frequency resource, and the scrambling code according to the random access preamble;
encode the data information by scrambling the data information using the scrambling code; and
encode the reference signal associated with the data information using the cyclic shift.

18. A network device, comprising a processor and a memory, wherein the memory containing instructions executable by the processor whereby the network device is operative to:
receive a random access preamble and a data block transmitted by a terminal device on a time-frequency resource, wherein the data block comprises data information and a reference signal associated with the data information, the data information is encoded with a scrambling code, and the reference signal associated with the data information is encoded with an orthogonal cover code and/or a cyclic shift;
decode the data information transmitted on the time-frequency resource;
transmit to the terminal device a response message.

19. The network device of claim 18, wherein the random access preamble belongs to a plurality of random access preambles which are associated with the time-frequency resource for data.

20. The network device of claim 18, wherein the network device is operative to:
determine a multiplexing level according to a detection of the random access preambles.

* * * * *